United States Patent
Sargaison et al.

(10) Patent No.: US 7,813,909 B2
(45) Date of Patent: Oct. 12, 2010

(54) REGISTER MAPPING IN EMULATION OF A TARGET SYSTEM ON A HOST SYSTEM

(75) Inventors: Stewart Sargaison, Foster City, CA (US); Victor Suba, San Mateo, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 118 days.

(21) Appl. No.: 11/696,691

(22) Filed: Apr. 4, 2007

(65) Prior Publication Data

US 2008/0040093 A1 Feb. 14, 2008

Related U.S. Application Data

(60) Provisional application No. 60/746,267, filed on May 3, 2006, provisional application No. 60/746,268, filed on May 3, 2006, provisional application No. 60/746,273, filed on May 3, 2006, provisional application No. 60/797,435, filed on May 3, 2006, provisional application No. 60/797,761, filed on May 3, 2006, provisional application No. 60/797,762, filed on May 3, 2006.

(51) Int. Cl.
G06F 9/44 (2006.01)
G06F 9/455 (2006.01)

(52) U.S. Cl. .................................. 703/20; 703/27
(58) Field of Classification Search .................. 703/20, 703/27
See application file for complete search history.

(56) References Cited

U.S. PATENT DOCUMENTS

| | | | |
|---|---|---|---|
| 4,587,612 A | 5/1986 | Fisk et al. ............... | 703/26 |
| 5,551,015 A | 8/1996 | Goettelmann et al. ...... | 717/137 |
| 5,560,013 A | 9/1996 | Scalzi et al. | |
| 5,649,203 A | 7/1997 | Sites ..................... | 717/156 |
| 5,768,593 A | 6/1998 | Walters et al. | |
| 5,815,720 A | 9/1998 | Buzbee | |
| 6,016,542 A | 1/2000 | Gottlieb et al. | |
| 6,031,992 A | 2/2000 | Cmelik et al. | |

(Continued)

FOREIGN PATENT DOCUMENTS

EP 0945796 9/1999

(Continued)

OTHER PUBLICATIONS

"Energy-Efficient Design", Kunio Uchiyama, 2005 IEEE.*

(Continued)

*Primary Examiner*—Paul L Rodriguez
*Assistant Examiner*—Nithya Janakiraman
(74) *Attorney, Agent, or Firm*—Joshua D. Isenberg; JDI Patent

(57) ABSTRACT

Methods and systems for register mapping in emulation of a target system on a host system are disclosed. Statistics for use of a set of registers of a target system processor are determined. Based on the statistics a first subset of the target system registers, including one or more most commonly used registers is determined. The registers in the first subset are directly mapped to a first group of registers of a host system processor. A second subset of the set of target system registers is dynamically mapped to a second group of registers of the host system processor.

17 Claims, 3 Drawing Sheets

U.S. PATENT DOCUMENTS

| | | | |
|---|---|---|---|
| 6,047,381 A | 4/2000 | Klein | |
| 6,115,054 A | 9/2000 | Giles | |
| 6,151,670 A | 11/2000 | Lange et al. | 712/228 |
| 6,158,047 A | 12/2000 | Le et al. | |
| 6,247,172 B1 | 6/2001 | Dunn et al. | |
| 6,314,560 B1 | 11/2001 | Dunn et al. | |
| 6,327,704 B1 | 12/2001 | Mattson et al. | |
| 6,332,214 B1 | 12/2001 | Wu | |
| 6,397,242 B1 | 5/2002 | Devine et al. | |
| 6,463,582 B1 | 10/2002 | Lethin et al. | |
| 6,502,237 B1 | 12/2002 | Yates et al. | |
| 6,529,862 B1 | 3/2003 | Mann et al. | 703/26 |
| 6,532,532 B1 | 3/2003 | Eaton et al. | |
| 6,631,514 B1 | 10/2003 | Le | 717/137 |
| 6,672,963 B1 | 1/2004 | Link | 463/43 |
| 6,704,925 B1 | 3/2004 | Bugnion | |
| 6,763,328 B1 | 7/2004 | Egolf et al. | |
| 6,882,968 B1 | 4/2005 | Linden | |
| 6,884,171 B2 | 4/2005 | Eck et al. | 463/42 |
| 6,993,751 B2 | 1/2006 | Bhansali et al. | |
| 7,000,226 B2 | 2/2006 | Gao et al. | |
| 7,096,460 B1 | 8/2006 | Banning et al. | |
| 7,107,580 B2 | 9/2006 | Zemach et al. | |
| 7,117,143 B2 | 10/2006 | Wang et al. | |
| 7,181,601 B2 | 2/2007 | Rudd et al. | |
| 7,210,144 B2 | 4/2007 | Traut | |
| 7,260,815 B1 | 8/2007 | Chen et al. | |
| 7,624,384 B2 | 11/2009 | Zhang et al. | |
| 2002/0066086 A1 | 5/2002 | Linden | 717/145 |
| 2002/0156977 A1 | 10/2002 | Derrick et al. | |
| 2003/0093649 A1 | 5/2003 | Hilton | |
| 2003/0093775 A1 | 5/2003 | Hilton | |
| 2004/0158681 A1 | 8/2004 | Hooker | |
| 2004/0205733 A1 | 10/2004 | Souloglou et al. | 717/138 |
| 2004/0221273 A1 | 11/2004 | Sandham | |
| 2004/0221278 A1 | 11/2004 | Dankel et al. | |
| 2005/0015754 A1 | 1/2005 | Werner et al. | 717/136 |
| 2005/0015756 A1 | 1/2005 | Brown et al. | |
| 2005/0015758 A1 | 1/2005 | North | |
| 2005/0149697 A1 | 7/2005 | Enright et al. | |
| 2006/0029234 A1 | 2/2006 | Sargaison | 381/74 |
| 2006/0114132 A1 | 6/2006 | Zhang et al. | |
| 2007/0180438 A1 | 8/2007 | Suba | 717/151 |
| 2007/0260446 A1 | 11/2007 | Suba et al. | 703/25 |
| 2007/0261038 A1 | 11/2007 | Sargaison et al. | 717/136 |
| 2007/0261039 A1 | 11/2007 | Sargaison et al. | 717/138 |
| 2007/0277052 A1 | 11/2007 | Sargaison et al. | 713/400 |
| 2008/0052691 A1 | 2/2008 | Neelakantam et al. | |
| 2008/0092151 A1 | 4/2008 | Brown | |

FOREIGN PATENT DOCUMENTS

| WO | WO2007096602 | 8/2007 |
|---|---|---|

OTHER PUBLICATIONS

"A retargetable, ultra-fast instruction set simulator", Zhu and Gajski, 1999.*

International Search Report and Written Opinion of the International Searching Authority—International application No. PCT/US07/67133.

Wang. ISSCC 2005—"The CELL Microprocessor Real World Technologies"—Feb. 2005, pp. 1-9.

International Search Report and Written Opinion of the International Searching Authority—International application No. PCT/US07/67142 dated May 21, 2008.

U.S. Appl. No. 60/746,273, entitled "Method and Apparatus for Resolving Clock Management Issues in the Emulation Involving Both Interpreted and Translated Code" filed May 3, 2006.

U.S. Appl. No. 60/746,267, to Stewart Sargaison, et al. "Translation Block Invalidation Prehints in Emulation of a Target System on a Host System", filed May 3, 2006.

U.S. Appl. No. 60/746,268, to Stewart Sargaison, et al. "Register Mapping in Emulation a Target System on a Host System", filed May 3, 2006.

U.S. Appl. No. 60/797,762, to Victor Suba, entitled "Stall Prediction Thread Management", filed May 3, 2006.

U.S. Appl. No. 60/797,435, to Victor Suba et al., entitled "DMA and Graphics Interface Emulation", filed May 3, 2006.

U.S. Appl. No. 60/797,761, to Victor Suba et al., entitled "Code Translation and Pipeline Optimization", filed May 3, 2006.

U.S. Appl. No. 60/763,568, to Victor Suba, entitled "Branch Prediction Thread Management" filed Jan. 30, 2006.

International Search Report and Written Opinion of the International Searching Authority dated Jul. 30, 2008—International Patent Application No. PCT/ US07/67146.

Smelyanskiy M. et al :"Register Queues: A New Hardware/Software Approach to Efficient Software Pipelining"—IEEE, 2000, pp. 3-12.

Proebsting T. et al.: "Probabilistic Register Allocation", ACM SIGPLAN Notices, vol. 27, No. 7, Jul. 1, 1992, pp. 300-310.

European Search Report for European Application No. 07761060 (International application No. PCT/US2007/067142) dated Mar. 30, 2009, 8 pages.

European Search Report for European Application No. 07761064 (International application No. PCT/US2007/067146) dated Apr. 6, 2009, 7 pages.

Office Action dated Sep. 14, 2009 issued for U.S. Appl. No. 11/696,699.

Kahle et al., "Introduction to the Cell Multiprocessor", IBM Journal of Research and Development, vol. 49, No. 4/5, Jul.-Sep. 2005, pp. 589-604.

Office Action dated Oct. 6, 2009 issued for U.S. Appl. No. 11/696,684.

Office Action dated Nov. 13, 2008 issued for U.S. Appl. No. 11/700,448.

Notice of Allowance and Fee(s) Due dated Apr. 21, 2009 issued for U.S. Appl. No. 11/700,448.

Eichenberger, A, E et al.—Optimizing Complier for a CELL Processor, 2005, IEEE, 12 pages.

McNairy, C et al.—Montecio: A Dual-Core, Dual Thread Itanium Processor, 2005, IEEE, pp. 10-20.

Notice of Allowance and Fee(s) dated Apr. 12, 2010 for U.S. Appl. No. 11/696,684.

Notice of Allowance and Fee(s) dated Mar. 25, 2010 for U.S. Appl. No. 11/696,699.

* cited by examiner

US 7,813,909 B2

REGISTER MAPPING IN EMULATION OF A TARGET SYSTEM ON A HOST SYSTEM

CROSS-REFERENCE TO RELATED APPLICATION

This application claims the benefit of priority of U.S. provisional application No. 60/746,273 METHOD AND APPARATUS FOR RESOLVING CLOCK MANAGEMENT ISSUES IN EMULATION INVOLVING BOTH INTERPRETED AND TRANSLATED CODE, filed May 3, 2006, the entire disclosures of which are incorporated herein by reference. This application claims the benefit of priority of U.S. provisional application No. 60/746,267, to Stewart Sargaison et al, entitled TRANSLATION BLOCK INVALIDATION PREHINTS IN EMULATION OF A TARGET SYSTEM ON A HOST SYSTEM, filed May 3, 2006, the entire disclosures of which are incorporated herein by reference. This application claims the benefit of priority of U.S. provisional application No. 60/746,268, to Stewart Sargaison et al, entitled REGISTER MAPPING IN EMULATION A TARGET SYSTEM ON A HOST SYSTEM, filed May 3, 2006, the entire disclosures of which are incorporated herein by reference. This application claims the benefit of priority of U.S. provisional application No. 60/797,762, to Victor Suba, entitled STALL PREDICTION THREAD MANAGEMENT, filed May 3, 2006, the entire disclosures of which are incorporated herein by reference. This application claims the benefit of priority of U.S. provisional application No. 60/797,435, to Stewart Sargaison et al, entitled DMA AND GRAPHICS INTERFACE EMULATION, filed May 3, 2006, the entire disclosures of which are incorporated herein by reference. This application also claims the benefit of priority of U.S. provisional application No. 60/797,761, to Stewart Sargaison et al, entitled CODE TRANSLATION AND PIPELINE OPTIMIZATION, filed May 3, 2006, the entire disclosures of which are incorporated herein by reference.

This application claims the benefit of priority of U.S. patent application Ser. No. 11/700,448, filed Jan. 30, 2007, which claims the benefit of priority of U.S. provisional patent application No. 60/763,568 filed Jan. 30, 2006. The entire disclosures of application Ser. Nos. 11/700,448 and 60/763,568 are incorporated herein by reference.

This application is related to commonly-assigned, co-pending application number 11/696,684, to Stewart Sargaison et al, entitled TRANSLATION BLOCK INVALIDATION PREHINTS IN EMULATION OF A TARGET SYSTEM ON A HOST SYSTEM, filed the same day as the present application, the entire disclosures of which are incorporated herein by reference. This application is related to commonly-assigned, co-pending application number 11/696,699, to Stewart Sargaison et al, entitled METHOD AND APPARATUS FOR RESOLVING CLOCK MANAGEMENT ISSUES IN EMULATION INVOLVING BOTH INTERPRETED AND TRANSLATED CODE, filed the same day as the present application, the entire disclosures of which are incorporated herein by reference.

FIELD OF THE INVENTION

Embodiments of this invention relate to emulation of a target computer platform on a host computer platform and more particularly to register mapping between target and host systems having different sized registers.

BACKGROUND OF THE INVENTION

The process of emulating the functionality of a first computer platform (the "target system") on a second computer platform (the "host system") so that the host system can execute programs designed for the target system is known as "emulation." Emulation has commonly been achieved by creating software that converts program instructions designed for the target platform (target code instructions) into the native-language of a host platform (host instructions), thus achieving compatibility. More recently, emulation has also been realized through the creation of "virtual machines," in which the target platform's physical architecture—the design of the hardware itself—is replicated via a virtual model in software.

Two main types of emulation strategies currently are available in the emulation field. The first strategy is known as "interpretation", in which each target code instruction is decoded in turn as it is addressed, causing a small sequence of host instructions then to be executed that are semantically equivalent to the target code instruction. The main component of such an emulator is typically a software interpreter that converts each instruction of any program in the target machine language into a set of instructions in the host machine language, where the host machine language is the code language of the host computer on which the emulator is being used. In some instances, interpreters have been implemented in computer hardware or firmware, thereby enabling relatively fast execution of the emulated programs.

The other main emulation strategy is known as "translation", in which the target instructions are analyzed and decoded. This is also referred to as "recompilation" or "cross-compilation". It is well known that the execution speed of computer programs is often dramatically reduced by interpreters. It is not uncommon for a computer program to run ten to twenty times slower when it is executed via emulation than when the equivalent program is recompiled into target machine code and the target code version is executed. Due to the well known slowness of software emulation, a number of products have successfully improved on the speed of executing source applications by translating portions of the target program at run time into host machine code, and then executing the recompiled program portions. While the translation process may take, e.g., 50 to 100 machine or clock cycles per instruction of the target code, the greater speed of the resulting host machine code is, on average, enough to improve the overall speed of execution of most source applications.

Emulation, whether by interpretation or translation or some combination of both often requires a software simulation of various components of a target system on a host system. It is frequently the case that the target and host systems are based on different types of processor architectures. For example the target device may be a game console, such as the Sony PlayStation®2. PlayStation is a registered trademark of Sony Computer Entertainment Corporation of Tokyo, Japan. This particular device is built around a main processor engine referred to as an Emotion Engine (EE), which is based on a 128-bit central processor unit (CPU) core. The number of registers in the CPU and the size of each (number of bits) are important factors in determining the power and speed of a CPU. For example, the CPU core in the EE uses 128-bit registers. With 128-bit registers, each CPU instruction can manipulate 128 bits of data.

The EE may be emulated by a host system having different processor architecture with different-sized registers. If the host system is based on larger sized registers, this is not a problem as it is relatively straightforward to emulate 128-bit registers with a processor having larger-sized registers. However, if the PlayStation®2 is emulated by a cell-processor based host system (such as the PlayStation®3), a problem arises. The cell processors are a type of parallel processor. The basic configuration of a cell processor includes a "Power Processor Element" ("PPE")(sometimes called "Processing Element", or "PE"), and multiple "Synergistic Processing Elements" ("SPE"). The PPEs and SPEs are linked together by an internal high speed bus dubbed "Element Interconnect Bus" ("EIB"). Cell processors are designed to be scalable for use in applications ranging from the hand held devices to main frame computers. The PPE is the main processor for emulation the PS2 EE. Unfortunately, the PPE uses 64-bit registers, which are smaller than the 128-bit EE CPU registers.

Thus, there is a need in the art, for emulating a target system on a host system having smaller sized registers than the target system.

SUMMARY OF THE INVENTION

The above disadvantages are overcome by embodiments of the present invention directed to methods and systems for emulation of a target system on a host system. Statistics for use of a set of registers of a target system processor are determined. Based on the statistics a first subset of the target system registers, including one or more most commonly used registers is determined. The registers in the first subset are directly mapped to a first group of registers of a host system processor. A second subset of the set of target system registers is dynamically mapped to a second group of registers of the host system processor.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Figure 1A:
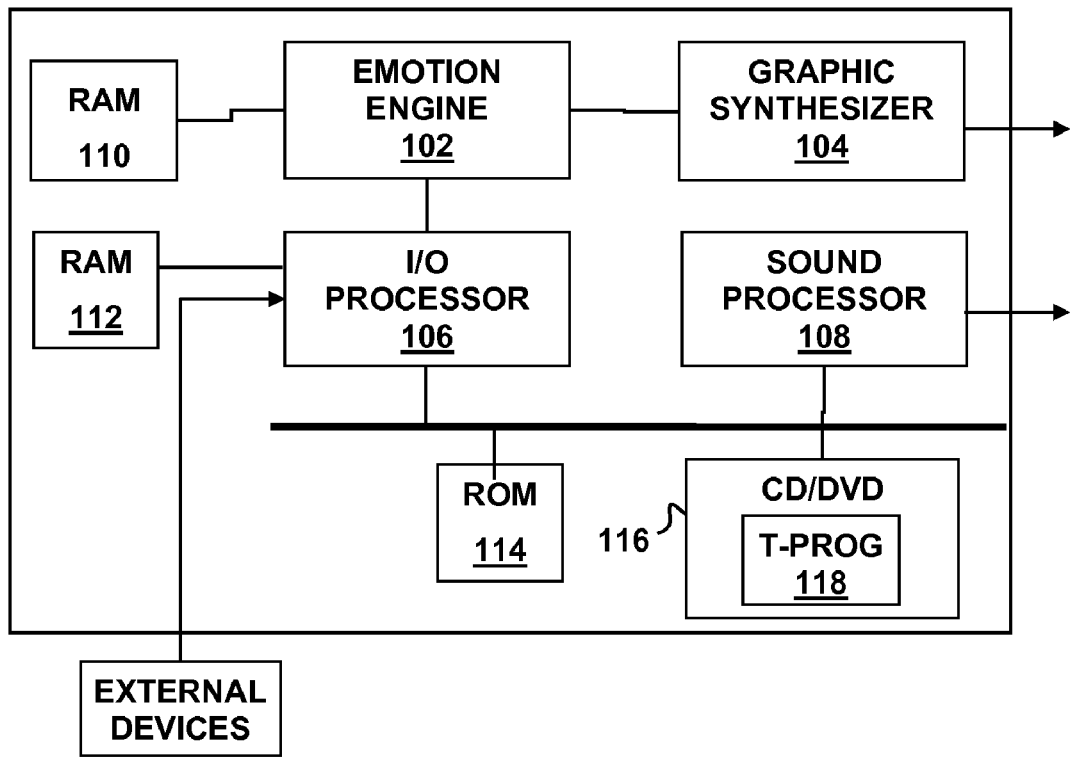
FIG. 1A is a block diagram of a target device that is to be emulated according to an embodiment of the present invention.

Embodiments of the present invention address emulation of a target system on a host system having different-sized registers. By way of example FIG. 1A depicts a block diagram of a target system 100 in the form of a game console device. The target system is built around a main processor module 102 referred to as an emotion engine, a Graphic Synthesizer 104, an input/output (J/O) processor (IOP) 106 and a sound processor unit 108. The emotion engine 102 typically includes a CPU core, co-processors and a system clock and has an associated random access memory (RAM) 110. The emotion engine 102 performs animation calculation, traverses a scene and converts it to a two-dimensional image that is sent to the Graphic Synthesizer (GS) 104 for rasterization.

Figure 1B:
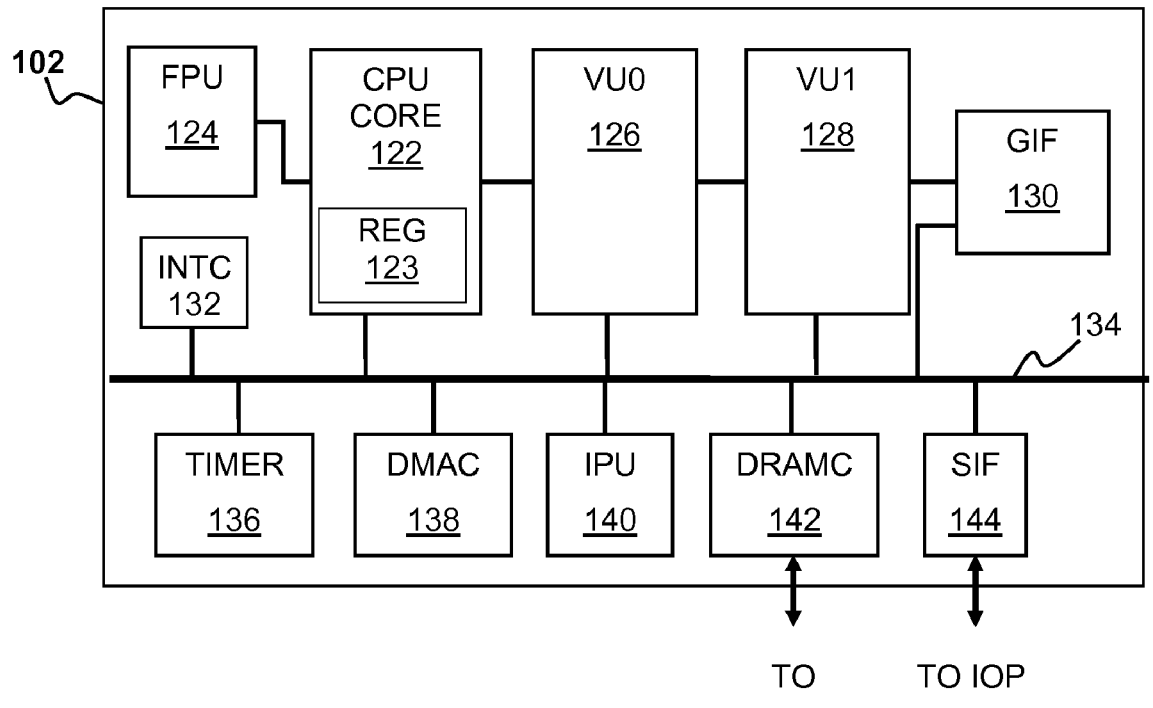
FIG. 1B is a block diagram of an emotion engine of the target device of FIG. 1A.

As shown in FIG. 1B, the EE 102 includes a CPU core 122, with an associated floating point unit (FPU)coprocessor 124, first and second vector co-processors 126, 128, a graphics interface controller 130 and an interrupt controller (INTC) 132. The CPU 122, vector co-processors 126, 128, GIF 130 and INTC 132 are coupled to a 128-bit main bus 134. The FPU 124 is directly coupled to the CPU 122. The CPU 122 is coupled to a first vector co-processor (VU0) 126, which is, in turn, coupled to a second vector co-processor (VU1) 128. The second vector co-processor VU1 128 is coupled to a graphics interface (GIF) 130. The EE 102 additional includes a timer 136, a direct memory access controller (DMAC) 138, an image data decompression processor (IPU) 140 a DRAM controller 142 and a sub-bus interface (SIF) 144 that facilitates communication between the EE 102 and the IOP 106.

The CPU core 122 may be a 128-bit processor operating at a 300 megahertz clock frequency using a MIPS instruction set with 64-bit instructions operating as a 2-way superscalar with 128-bit multimedia instructions. These instructions are handled using 128-bit registers 123. The CPU 122 may include a data cache, an instruction cache and an area of on-chip memory sometimes referred to as a scratchpad. The scratchpad serves as a small local memory that is available so that the CPU 122 can perform certain operations while the main bus 134 is busy transferring code and/or data. The first vector unit 126 may be used for animation and physics calculations. The second vector unit 128 may be used for geometry transformations. The GIF 130 serves as the main interface between the EE 102 and the GS 104.

The IOP 106 may include a processor for backwards compatibility with prior versions of the target system 100 and its own associated RAM 112. The IOP 106 handles input and output from external devices such as controllers, USB devices, a hard disc, Ethernet card or modem, and other components of the system such as the sound processor unit 108, a ROM 114 and a CD/DVD unit 116. A target program 118 may be stored on a CD/ROM disc loaded in the CD/DVD unit 116. Instructions from the target program 118 may be stored in EE RAM 108 or IOP RAM 112 and executed by the various processors of the target system 100 in a native machine code that can be read by these processors.

Figure 2A:
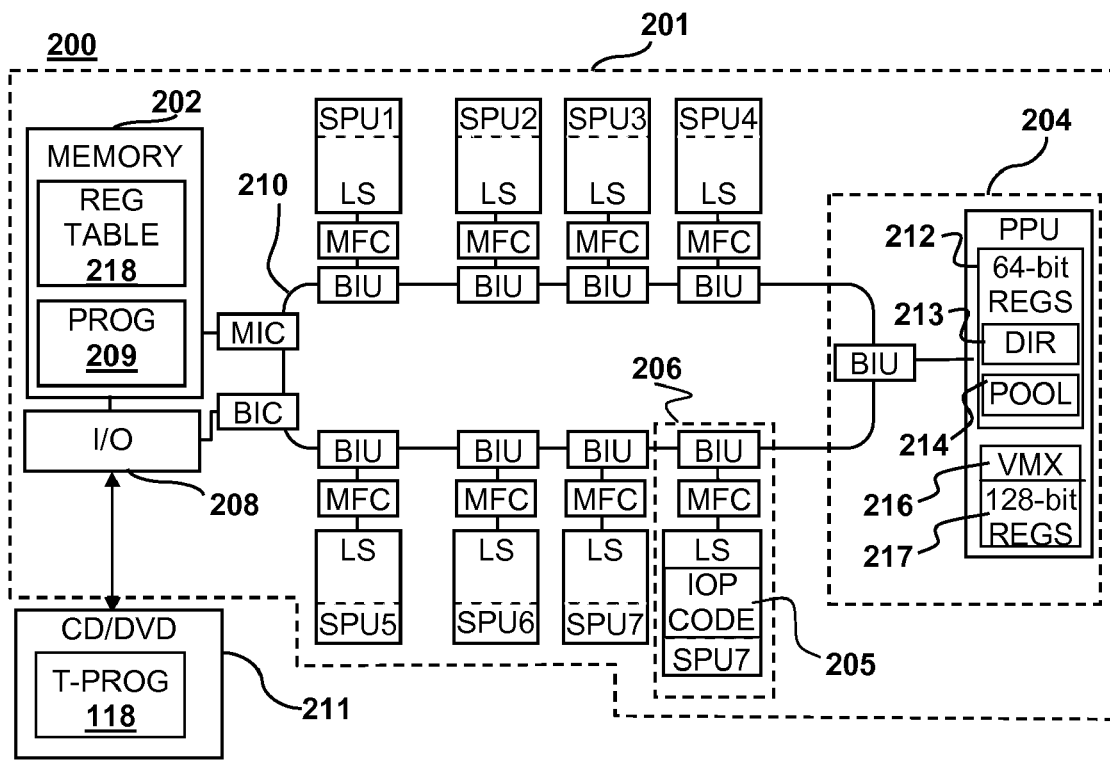
FIG. 2A is a schematic diagram of a host device that emulates the target device of FIGS. 1A-1B using register mapping according to an embodiment of the present invention.

In embodiments of the present invention, the target system 100 may be emulated using a parallel processing host system 200 so that the host system 200 can run programs written in code native to the target system 100 such as target program 118. FIG. 2A depicts an example of a host system 200 based on a cell processor 201 that may be configured to emulate the target system 100. The cell processor 201 includes a main memory 202, a single power processor element (PPE) 204 and eight synergistic processor elements (SPE) 206. However, the cell processor 201 may be configured with more than one PPE and any number of SPE's. Each SPE 206 includes a synergistic processor unit (SPU) and a local store (LS). The memory 202, PPE 204, and SPEs 206 can communicate with each other and with an I/O device 208 over a ring-type element interconnect bus (EIB) 210. The PPE 204 and SPEs 206 can access the EIB 210 through bus interface units (BIU). The PPE 204 and SPEs 206 can access the main memory 202 over the EIB 210 through memory flow controllers (MFC). The memory 202 may contain an emulation program 209 that implements interpretation and translation of coded instructions written for the target system 100. These coded instructions may be read from a CD/ROM disc in a CD/DVD reader 211 coupled to the I/O device 208. A CD/ROM disc containing the target program 118 may be loaded into the CD/DVD reader 211. At least one of the SPE 206 receives in its local store emulated IOP code 205 having instructions that emulate the IOP 106 described above with respect to FIGS. 1A-1B.

The PPE 204 typically includes different types of registers 212. These may include thirty-two 64-bit general purpose registers, thirty-two 32-bit floating point registers and thirty-two 128-bit VMS registers. The PPE registers 212 may be divided into a direct-mapped group and a dynamically mapped group. The registers 123 in the CPU of the EE may be selectively mapped to these two groups. Based on statistics on use of the EE registers 123, the most commonly used EE registers 123 may be direct-mapped to a first group 213 of the PPE registers 212.

The EE registers 123 that are not direct mapped to registers in the first group 213 are dynamically mapped to a second group 214 of PPE registers 212. The second group 214 is sometimes referred to herein as a "pool" of dynamically mapped registers. The pool registers in the second group 214 may be rotated to prevent target system instructions from being blocked. As used herein, "rotation" of the registers refers to mapping of registers for subsequent instructions to different registers. By way of example, a sequence of target system instructions may be mapped such that a first instruction may add the value in register r0 to the value in register r10 and store the result in register r11 while a second instruction subtracts the value in register r12 from the value in register r0 and store the result in register r13. A subsequent target instruction that adds two different values may be mapped such that the value in register r1 is added to the value in register r14 and the result is stored in register r15. By rotating the pool registers an instruction is less likely to be blocked due to mapping of a target system register to a host system register that is already being used by another instruction.

The "pool" registers 214 may also be used to store intermediate results. By way of example, if a translated target system instruction maps to more than one host system instruction the values calculated by the different host instructions are examples of intermediate results. In embodiments of the present invention, the PPE 204 may optionally include a co-processor 216 (sometimes referred to as a VMX unit) for implementing floating point and single instruction multiple data (SIMD) instruction sets. The co-processor 216 may include 128-bit registers 217. These co-processor registers 217 may be used for mapping of some of the registers that would otherwise be mapped to the first group 213 or the second group 214. The PPE 204 may have different types of PPE registers 212. For example, the PPE 204 may include thirty-two 64-bit general purpose registers, thirty-two 32-bit floating point registers and thirty-two 128-bit registers 217 in the VMX co-processor 216.

Figure 2B:
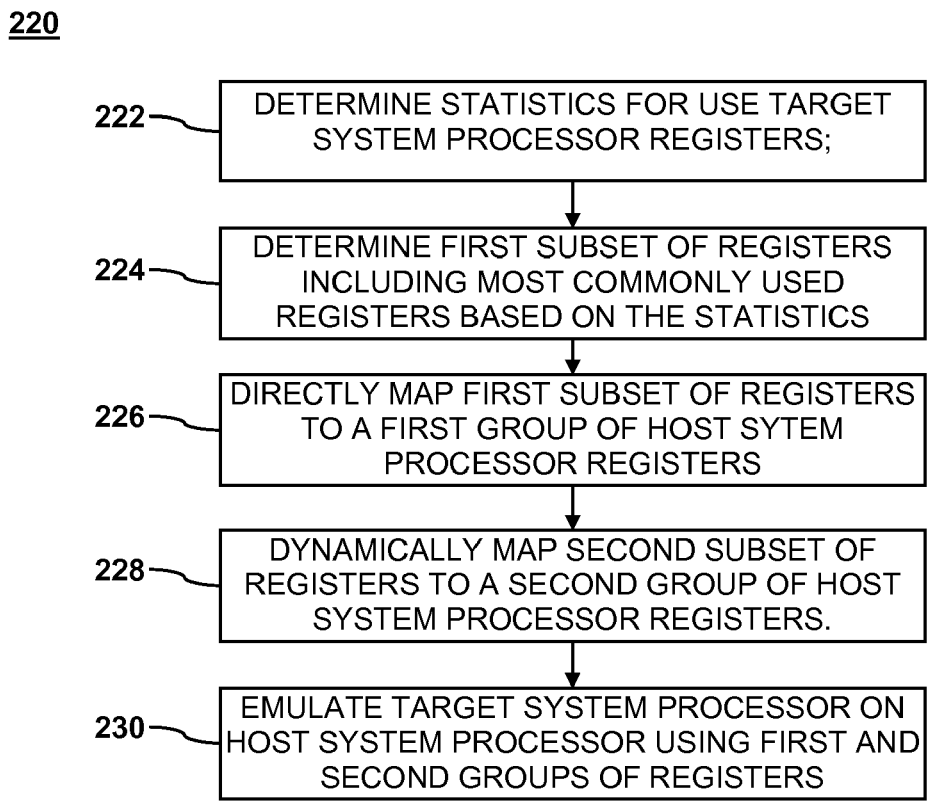
FIG. 2B is a flow diagram of method of register mapping in emulation of a target device by a host device according to an embodiment of the present invention.

In embodiments of the invention, the host system 200 may emulate the target system 100 according to a method 220 as illustrated in FIG. 2B. At 222 statistics are determined for use of a set of registers 123 of a processor in the target system 100, e.g., the CPU 122 of the EE 102. An application boundary interface (ABI) may be used to determine which EE registers 123 are most frequently read and written and most suitable for direct mapping. The mapping for both direct-mapped and dynamically-mapped EE registers 123 may be dynamically reconfigured in response to changes in the statistics. Based on the statistics, a first subset of the registers 123 is determined at 224. The first subset includes some of the most commonly used registers. By way of example, half the registers 123 may be assigned to the first subset. If there are 32 registers 123, 16 of them would be assigned to the first subset. The register mapping may be stored in a look-up table 218 stored in the main memory 202. Different register mapping schemes may be stored in different look-up tables 218. These different register mapping schemes may be swapped in and out by changing a pointer to a look-up table memory location from one table to another.

At 226 these most commonly used registers are directly mapped to a first group of registers of a processor on the host system 200. For example the most commonly used CPU registers 123 may be directly mapped to the first group 213 of PPE registers 212 or to some subset of the VMX registers 217. The remaining CPU registers 123 are dynamically mapped to a second group of host system registers as indicated at 228. By way of example, the remaining CPU registers 123 may be dynamically mapped to the pool registers 214 or to some subset of the VMX registers 217. As used herein, direct mapping refers to a consistent mapping between a target system register and one or more corresponding host system registers. Dynamic mapping contrast refers to a mapping between a target system register and whatever pooled host system register or registers happen to be available. It is noted that the sizes of the first group 213 and second group 214 may be selected such that all of the EE registers 123 are direct mapped or are all dynamically mapped or have any intermediate mapping of the EE registers 123 between the two groups 213, 214. It is further noted that the register mapping may also include mapping of registers for EE co-processors, such as the FPU 124, VU0 126 and VU1 128 as well as other target system processors such as the I/O processor 102, graphic synthesizer 104 and sound processor 108.

The CPU core 122 may then be emulated on the PPE 204 using the first and second groups of registers as indicated at 230. By way of example, in an embodiment of the invention, a translator running on the PPE 204 may emulate the EE 102 of the target system 100 by translating EE instructions of the target program 118 into machine code that can be run on the PPE 204. The PPE 204 may also implement an interpreter that emulates the IOP 106 by interpreting IOP instructions of the target program 118. The resulting interpreted code instructions 205 may be run on one of the SPE 206. During the emulation at 230 a processor on the host system 200 (e.g., the PPE 204) may perform an operation with the host processor that produces an intermediate result. The intermediate result may be temporarily stored in one or more of the pool registers 214.

The register mapping (direct or dynamic) may be history-dependent, data dependent and/or instruction dependent. For example registers for read-only values that are loaded on the fly, such as direct constants, may be directly mapped. Similarly registers containing values that are loaded on demand and chanced when necessary may be temporarily direct mapped for a certain amount of time. As an example of a history and instruction dependent mapping consider a situation where a prior EE instruction is a 128-bit instruction and the result of that instruction only works in 128-bit, e.g., a single instruction multiple data (SIMD) instruction. In such a case the register for that EE instruction may be direct mapped to a 128-bit VMX register. Registers for 128-bit vector floating point instructions on the target system may be mapped to 128-bit VMX registers 217. Registers for 16-bit integer instructions may be mapped to 64-bit registers on PPE 204.

Register mapping may also be driven by the type of device being emulated by the host system. For example, EE, registers for SIMD instructions may be directly mapped to the 128-bit VMX registers 217. Similarly, registers for 128-bit vector floating point instructions on VU0 126 may be mapped to the 128-bit VMX registers 217.

Figure 3:
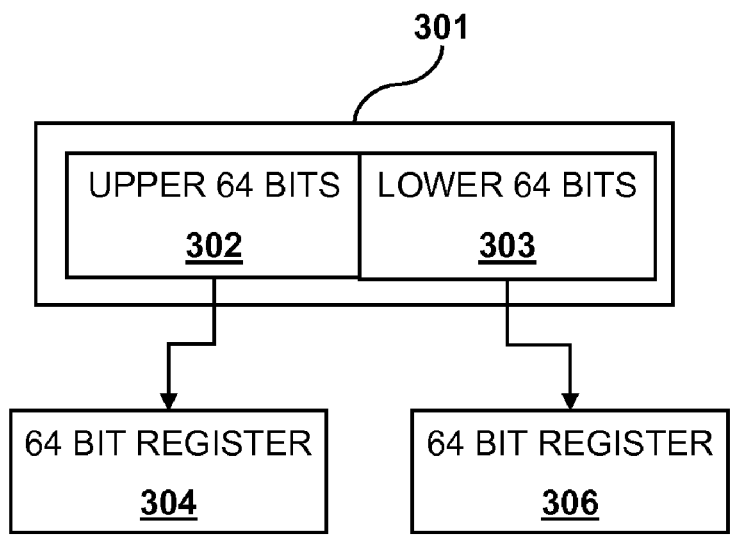
FIG. 3 is a block diagram illustrating an example of mapping a 128-bit target system register to two 64-bit host system registers according to an embodiment of the present invention.

As noted above, the CPU registers 123 may be of a larger size than the PPE registers 212. Specifically the CPU registers 123 may be 128-bit registers and the PPE registers 212 may be 64-bit registers. As shown in FIG. 3, a 128-bit target system register 301 may be mapped to two 64-bit host system registers 304, 306 by dividing the 128-bit register 301 into a lower 64-bit field 302 and an upper 64-bit field 303. The upper field 302 may be mapped to host system register 304 while the lower field 303 may be mapped to host system register 306. The emulation of parallel target system instructions such as parallel adds with 128-bit registers depends partly on the nature of the operands. If the operands for an instruction are in 128-bit registers, the operation is performed as a 128-bit operation with a carry between the highest bit of the lower field 303 and the lowest bit of the upper field 302. If the operands are in 64-bit registers two or more operations are performed with no carry between the highest bit of the lower field 303 and the lowest bit of the upper field 302.

Figure 4:
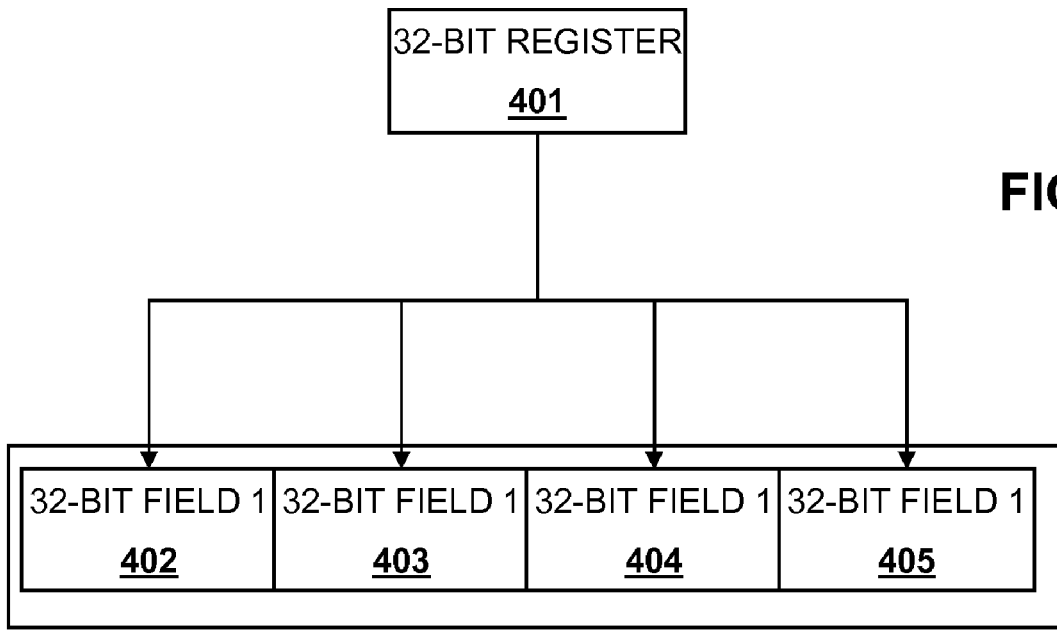
FIG. 4 is a block diagram illustrating an example of mapping registers for 32-bit floating point instructions to 128-bit VMX registers according to an embodiment of the present invention.

Registers for 32-bit floating point instructions may be mapped to 128-bit VMX registers 217 as shown in FIG. 4. Specifically each the value for a 32-bit target system register 401 is mapped to each of four 32-bit fields 402, 403, 404, 405 of a 128-bit host system register 401.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A" or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for emulation of a target system on a host system, the method comprising:
   determining statistics for use of a set of registers of a target system processor;
   based on the statistics, determining a first subset of registers of the set of registers, the first subset including one or more most commonly used registers;
   directly mapping the first subset of registers to a first group of registers of a host system processor;
   dynamically mapping a second subset of the set of registers to a second group of registers of the host system processor; and
   emulating the target system processor on the host system processor using the first and second groups of registers
   wherein some of the registers in the set of registers of the target system processor are larger than the registers in the first and second groups of registers of the host system processor; and
   wherein directly mapping the first subset of registers or dynamically mapping the second subset of registers includes mapping a lower field of a target system register to a first host system register and mapping an upper field of the target system register to a second host system register.

2. The method of claim 1 wherein the host system processor is a power processor element of a cell processor.

3. The method of claim 2 wherein one or more of the registers in the first and/or second groups are registers in a VMX unit of the power processor element.

4. The method of claim 1, further comprising performing an operation with the host processor that produces an intermediate result and storing the intermediate result in one or more registers of the second group of registers.

5. The method of claim 1 wherein the target system processor is an emotion engine.

6. The method of claim 5, further comprising emulating the emotion engine with the host system processor by translating instructions for the emotion engine into machine code that is readable by the host system processor.

7. The method of claim 1, further comprising rotating the dynamic mapping of the registers in the second subset to reduce a likelihood of blocking of a target system instruction.

8. The method of claim 6, wherein the target system includes one or more additional processors, the method further comprising emulating the one or more additional processors by interpreting instructions for the one or more additional processors and running the interpreted instructions on the host system processor or one or more co-processors associated with the host system processor.

9. The method of claim 1, further comprising dynamically reconfiguring the direct mapping of the first subset of registers and/or the dynamic mapping of the second subset of registers.

10. The method of claim 1 wherein emulating the target system includes translating instructions for the target system processor.

11. The method of claim 1 wherein the registers in the set of registers of the target system processor include 128-bit registers and the registers in the first and second groups of registers of the host system processor include 64-bit registers.

12. A host system for emulation of a target system, comprising:;
   one or more host system processors;
   a memory coupled to the one or more host system processors;
   a set of processor executable instructions embodied in the memory, the processor executable instructions including instructions for implementing a method for emulation of a target system on a host system, the method including:
   determining statistics for use of a set of registers of a target system processor;
   based on the statistics, determining a first subset of registers of the set of registers, the first subset including one or more most commonly used registers;

directly mapping the first subset of registers to a first group of registers of a host system processor; and dynamically mapping a second subset of the set of registers to a second group of registers of the host system processor wherein some of the registers in the set of registers of the target system processor are larger than the registers in the first and second groups of registers of the host system processor; and wherein directly mapping the first subset of registers or dynamically mapping the second subset of registers includes mapping a lower field of a target system register to a first host system register and mapping an upper field of the target system register to a second host system register.

13. The system of claim 12 wherein the one or more host system processors include a power processor element.

14. The system of claim 13 wherein the one or more host system processors further include one or more synergistic processor elements coupled to the power processor element, whereby the host system includes a cell processor.

15. The system of claim 13 wherein one or more of the registers in the first and/or second groups are registers in a VMX unit of the power processor element.

16. The system of claim 12 wherein the registers in the set of registers of the target system processor are larger than the registers in the first and second groups of registers of the host system processor.

17. The system of claim 16 wherein the registers in the set of registers of the target system processor are 128-bit registers and the registers in the first and second groups of registers of the host system processor are 64-bit registers.

* * * * *